UNITED STATES PATENT OFFICE.

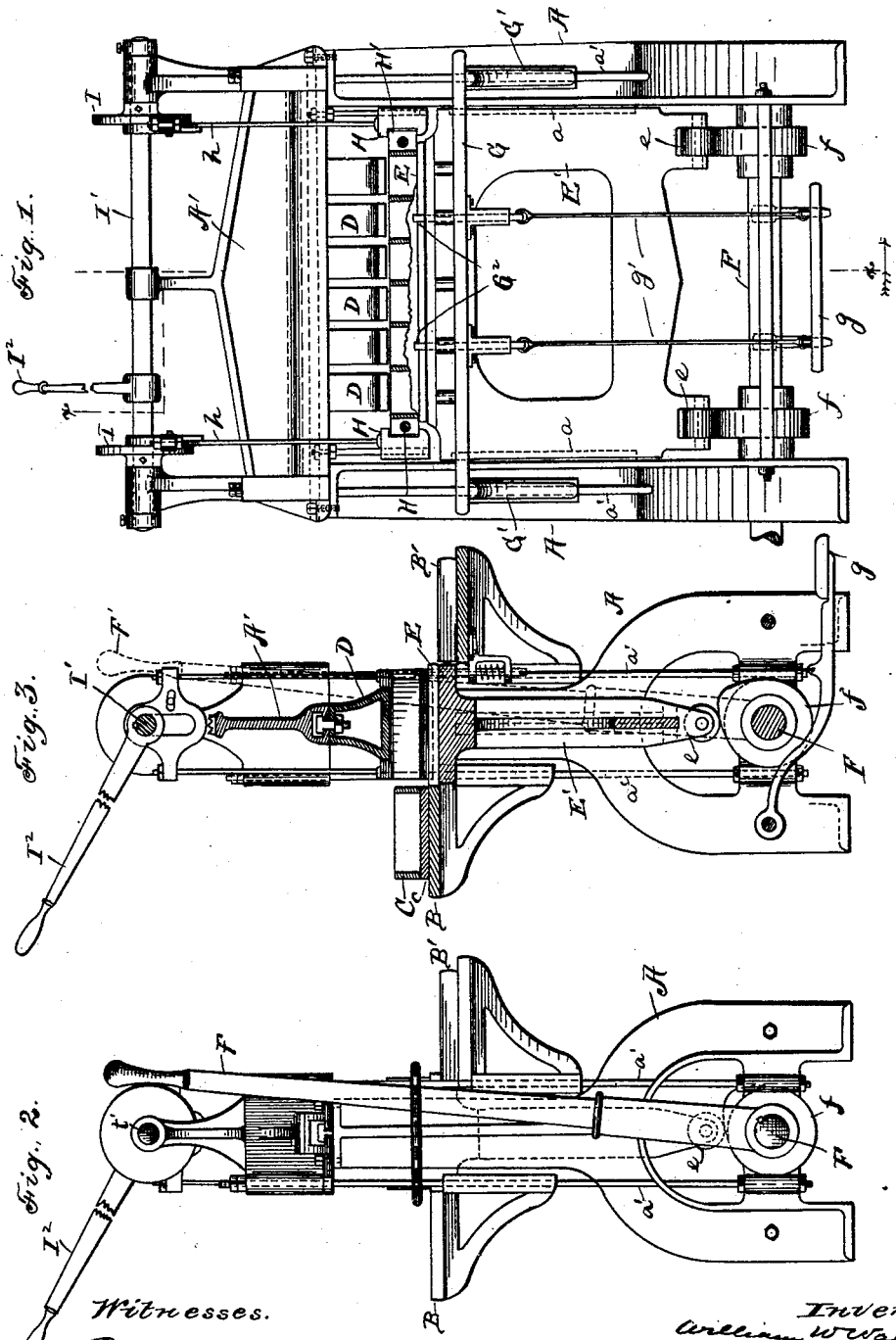

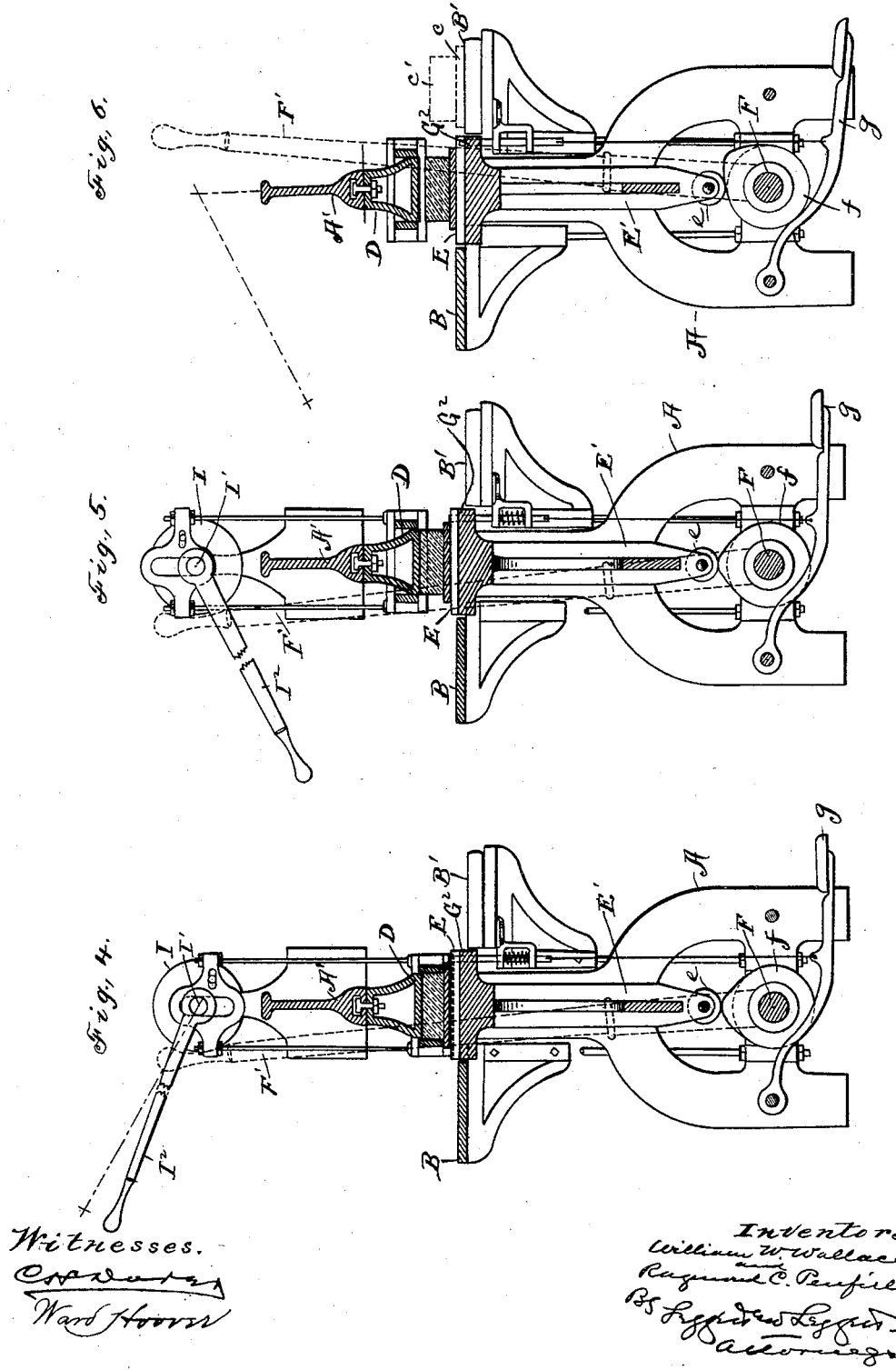

WILLIAM W. WALLACE AND RAYMOND C. PENFIELD, OF WILLOUGHBY, OHIO, ASSIGNORS TO J. W. PENFIELD & SON, OF SAME PLACE.

MACHINE FOR RE-PRESSING BRICKS.

SPECIFICATION forming part of Letters Patent No. 480,912, dated August 16, 1892.

Application filed August 22, 1891. Serial No. 403,470. (No model.)

*To all whom it may concern:*

Be it known that we, WILLIAM W. WALLACE and RAYMOND C. PENFIELD, of Willoughby, in the county of Lake and State of Ohio, have invented certain new and useful Improvements in Machines for Re-Pressing Brick; and we do hereby declare the following to be a full, clear, and exact description of the invention, such as will enable others skilled in the art to which it pertains to make and use the same.

Our invention relates to improvements in machines for re-pressing brick, the object being to repress the brick in the molds as they come from the brick-machine, provision being made for discharging the brick from the mold after the re-pressing, leaving the brick on the bottom board or pallet of the mold.

In the accompanying drawings, Figure 1 is a front side elevation. Fig. 2 is an end elevation. Figs. 3, 4, 5, and 6 are vertical sections on line $xx$, Fig. 1, showing, respectively, different working positions.

A A are the side frames of the press, and these are of course connected by suitable cross-bars, &c., to constitute a rigid framework.

To opposite sides of the frame are rigidly attached tables B B'. On table B is placed the mold C and bottom board or pallet $c$ just as it comes from the brick-machine, the molds being supposed to be filled with brick $c'$, that are to be re-pressed. After the re-pressing the pallet, with the brick thereon, is drawn out of the machine by hand, and later the empty mold is pushed out onto table B' by placing the next mold in the machine.

D D D are a series of stationary plungers adapted, respectively, to fit the different compartments of the mold, these plungers being adjustably attached to a stationary cross-bar A', the latter constituting a part of the framework aforesaid.

E is the pressing-table, mounted on the upper edge of frame E', this frame being adapted to reciprocate vertically on ways $a$. Frame E' is provided with rollers $e$, adapted to rest and travel on cam-wheels $ff$ of rock-shaft F, the latter being provided with a hand-lever F' for oscillating this shaft to reciprocate frame E' and the attached table E, these members E E' being lifted by the action of cams $ff$ and reversing by gravity.

G is a cross-bar that reciprocates on the stationary rods $a'$, these rods serving as ways for the cross-bar. The latter rests upon springs G', whereby the bar is held normally elevated, and for depressing the cross-bar against the action of its springs is provided a treadle $g$, connected by rods $g'$ with the cross-bar, so that the latter may be depressed by foot-power. Bar G is provided with upwardly-projecting pins $G^2$, that operate in holes of table E. In the depressed position of bar G the upper end of pins $G^2$ are flush with or a trifle below the face of the table. With the elevated position of bar G these pins protrude above the table and serve as stops for engaging the side of the mold in placing the latter on table E in position to co-operate with the plungers.

H H are hoisting-blocks or strippers, the same having notches H', that receive the ends of the mold. These blocks are adapted to reciprocate vertically, and to this end are connected, respectively, by rods $h$ with the eccentric-straps of the eccentrics I I, the latter being mounted on rock-shaft I'. This shaft is provided with a hand-lever $I^2$ for oscillating the shaft in operating blocks H, whereby the blocks may be elevated in stripping the mold from the brick, and the blocks are depressed in returning the mold to a position where it can be removed from the machine. Blocks H also serve as guides endwise the mold in placing the mold on table E, so that as between members H and $G^2$ the mold can be placed accurately upon table E to co-operate with the plungers D.

The operation of the machine is as follows: With table E and blocks H depressed, a mold C, filled with brick and resting upon the bottom board or pallet $c$, having previously been laid upon table E, is pushed by hand into the machine, whereupon by means of lever F' table E is elevated to press the brick against the plungers D. Next the lever should be reversed a trifle, so as to relieve somewhat the pressure on the brick, so that the latter be not crushed when the molds are stripped. The stripping is done by operating lever $I^2$ so as to elevate blocks H, whereby the mold is stripped from the brick, the mold passing up around plungers D. Next lever F' is further reversed to lower table E to the bottom of its throw, this table of course bearing the pallet on which the pressed brick rest. Next by means of the treadle stops $G^2$ are depressed, so as to be out of the way, after which the pallet, with the brick thereon, is removed by hand. Next lever $I^2$ is reversed, whereby the empty mold is lowered upon table E, and the empty mold is pushed out onto table B' in placing the next successive mold filled with brick in the machine. It will be seen, therefore, that the successive molds filled with brick as they come from the brick-machine are placed in the press, where the necessary pressure is applied, after which the molds are stripped from the brick and the latter are left upon the pallets ready for handling, and this is supposed to be done as fast as the brick-machine turns out the brick, whereby a great amount of labor in handling the brick is saved as compared with the methods heretofore employed in re-pressing brick.

What we claim is—

1. In a brick-re-pressing machine, a series of stationary plungers, an opposing moving table adapted to receive the mold filled with brick and the bottom board or pallet thereof as they come from the brick-machine, spring-actuated stops, and a treadle for depressing the stops against the action of the springs, combined with a stripping device, substantially as indicated, for stripping the mold from the brick while the latter remain upon the bottom board or pallet, substantially as set forth.

2. In a brick-re-pressing machine, a series of stationary plungers, and an opposing movable table, spring-actuated stops, and a treadle for depressing the stops against the action of their springs, substantially as set forth.

In testimony whereof we sign this specification, in the presence of two witnesses, this 27th day of July, 1891.

WILLIAM W. WALLACE.
RAYMOND C. PENFIELD.

Witnesses:
C. L. GRAY,
L. W. PENFIELD.